Inventor
Wallace E. Ward
By Clyde L. Rogers
his Attorney

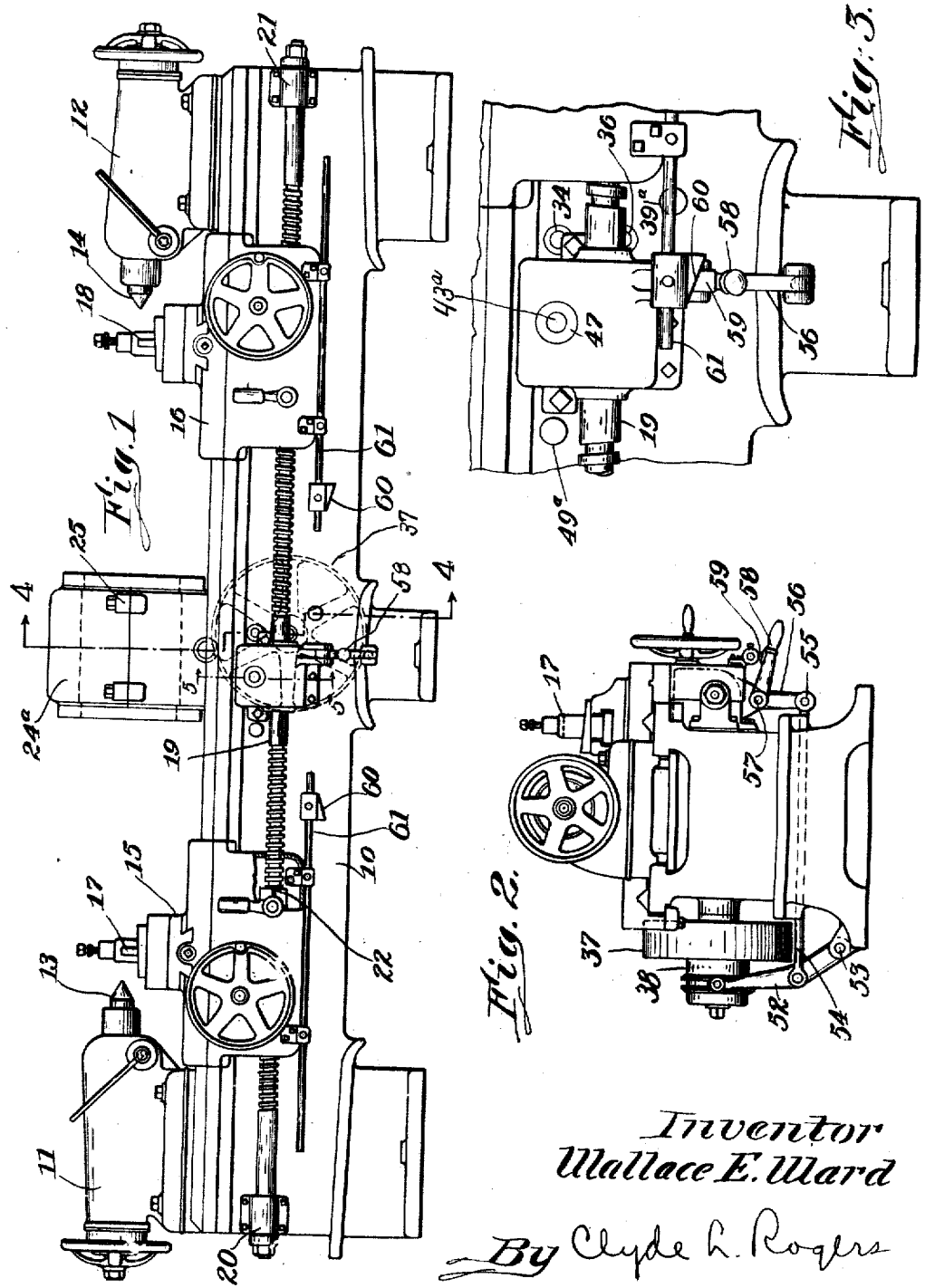

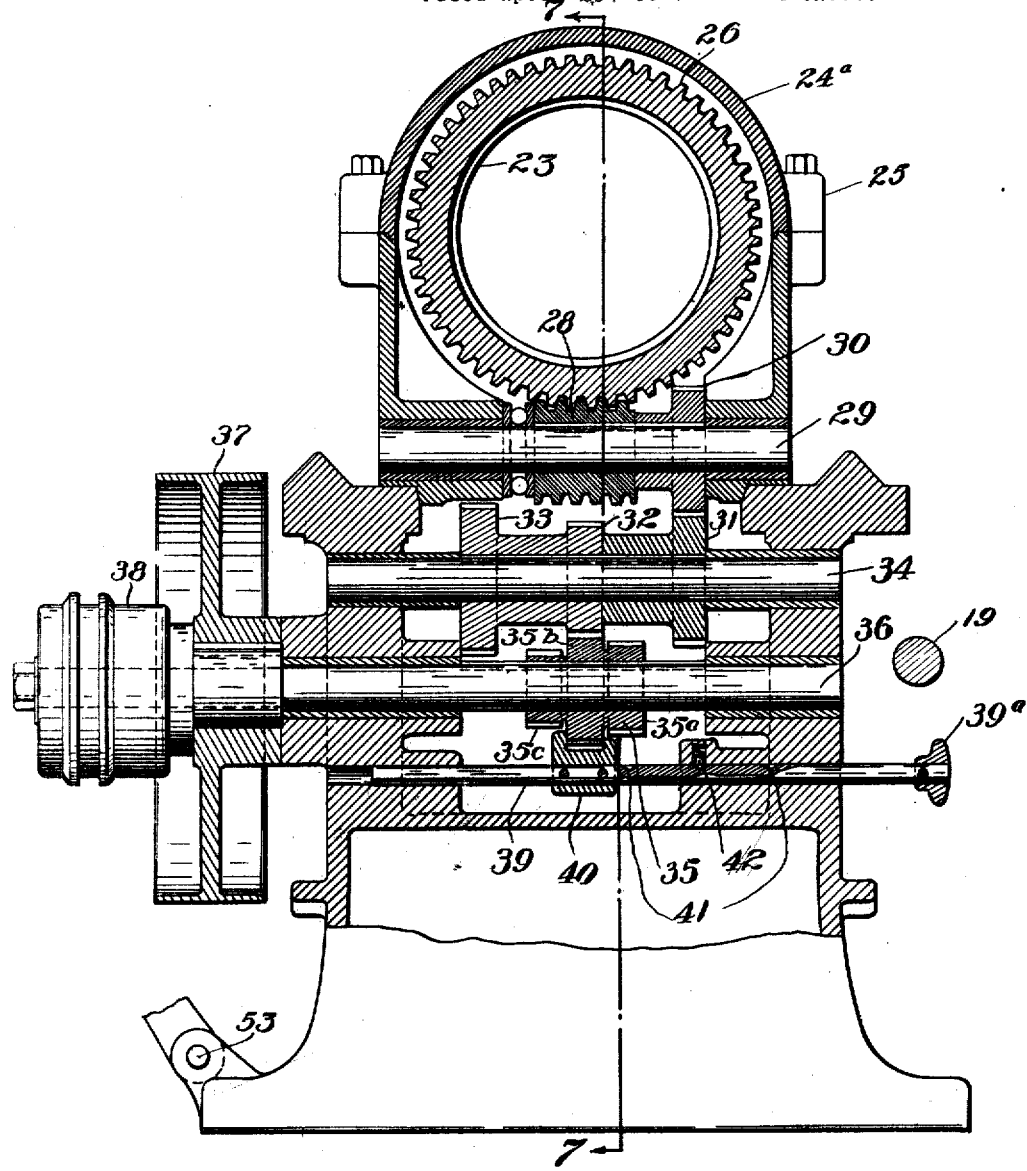

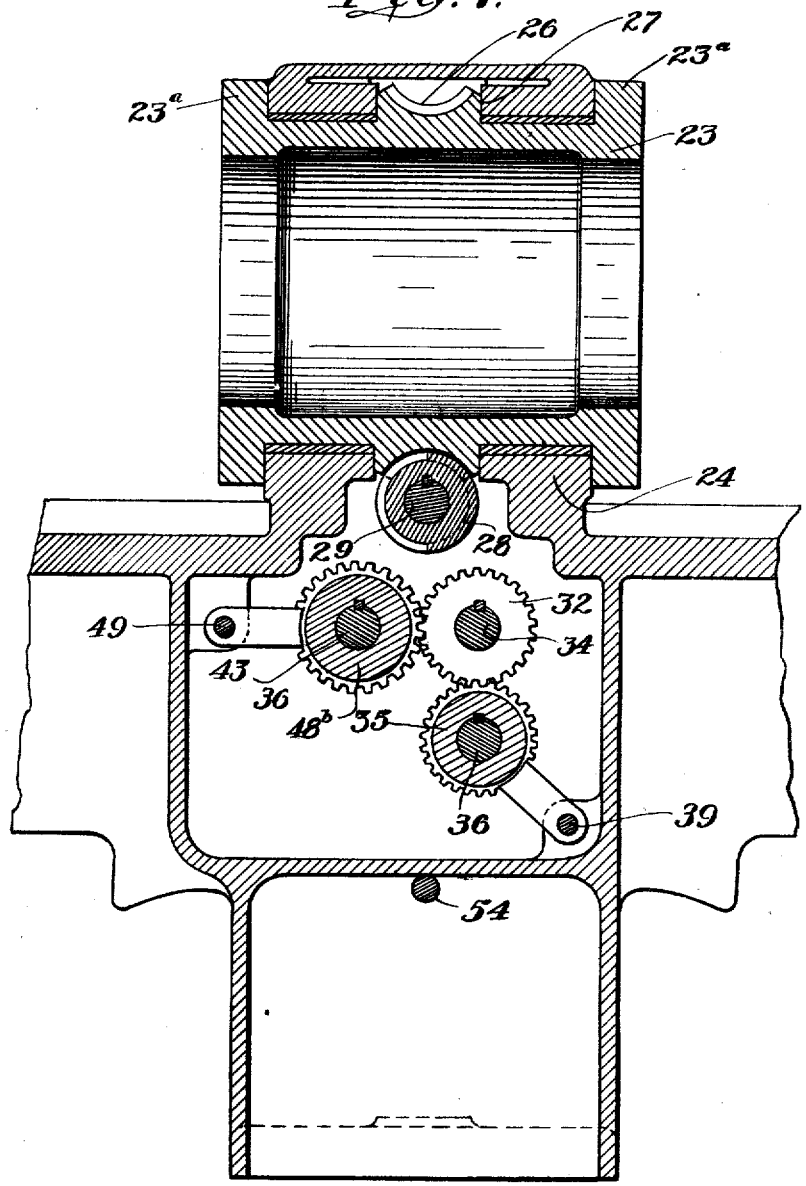

Patented Oct. 7, 1924

1,510,811

UNITED STATES PATENT OFFICE.

WALLACE E. WARD, OF ROCHESTER, NEW YORK, ASSIGNOR TO ARTHUR H. INGLE, OF ROCHESTER, NEW YORK.

CENTER-DRIVE AXLE LATHE.

Application filed April 20, 1920. Serial No. 375,263.

*To all whom it may concern:*

Be it known that I, WALLACE E. WARD, a citizen of the United States, and resident of Rochester, county of Monroe, State of New York, have invented an Improvement in Center-Drive Axle Lathes, of which the following description, in connection with the accompanying drawings, is a specification, like characters on the drawings representing like parts in each of the several views.

This invention relates to lathes for turning axles and like work wherein the work is passed through a hollow barrel or sleeve which is power driven and engaged with the work intermediate the length thereof to rotate the same for the turning operation. A principal object of the invention is to provide an axle or like lathe with driving means at the longitudinal center of the lathe and equipped with simple, compact and reliable means for effecting the requisite range of changes in speed to the driving sleeve or head along with other change gear connections for transmitting a requisite range of change feeds to the feed screw which controls the feed movements of the tool carriages. To this end I provide an axle lathe with a prime drive shaft mounted transversely in the bed preferably underneath the hollow driving head and equipped with change speed connections to said head which includes a slidingly shiftable multiple gear, the diverse size gear elements of which are selectively engageable with corresponding gears on an intermediate shaft which transmits to the hollow driving head. For transmitting impulse to the feed shaft I preferably employ a similar arrangement of shiftable gear elements which are also preferably arranged so as to partake of and thus multiply the range of speed changes to the driving head. A further object is to provide an improved form of automatic knock-out or stop device controlled by the tool carriage movement for stopping the feeds of the carriage or stopping the entire machine. The foregoing and other objects and advantages of the invention will more fully appear from the following detailed description and the distinctive features of novelty will be pointed out in the appended claims.

Referring to the drawings:

Fig. 1 is a side elevation showing a center drive axle lathe constructed in accordance with my invention;

Fig. 2 is an end view thereof looking from the left in Fig. 1;

Fig. 3 is an enlarged fragmentary front view illustrating the action of the automatic knock out;

Fig. 4 is an enlarged transverse section on line 4—4 of Fig. 1;

Fig. 7 is a partial lengthwise vertical section on line 7—7 of Fig. 4.

Figure 5:
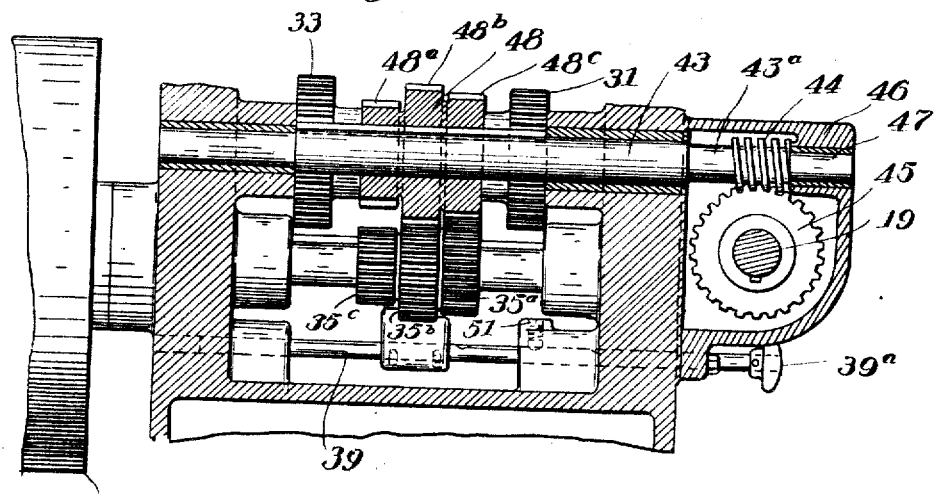
Fig. 5 is an enlarged partial transverse section on line 5—5 of Fig. 1.
Figure 6:
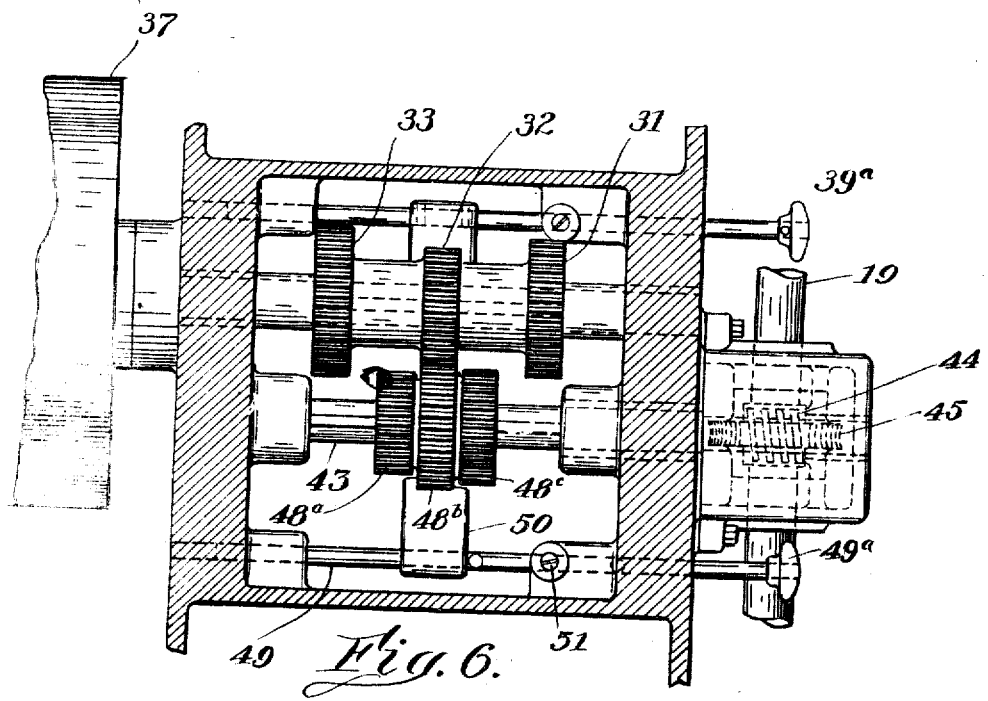
Fig. 6 is a partial sectional plan view showing the operative gearing.

The lathe bed 10 may be of usual type with mountings 11, 12 at the ends thereof to hold adjustably the dead centers 13, 14 each of which engages an end of the axle or other work piece to be operated on. On suitable ways of the lathe bed are mounted usual tool carriages 15, 16 equipped with mountings for suitable turning or forming tools 17, 18 as usual. The carriages 15, 16 are simultaneously fed in opposite directions on the bed ways by the feed screw 19 which extends the length of the lathe bed with bearings 20, 21 at the end thereof, the two end portions of this feed screw having the one right hand threads and the other left hand threads engaging suitable shear nuts 22 in the carriage aprons as usual. The hollow driving head or sleeve 23 is fitted intermediate the length of the bed to turn in a bearing seat 24 extending up from the bed, this bearing seat being shown as fitting between flanged ends 23ª of the driving head and encircling the same, the upper half 24ª of said bearing being formed in a separate piece and removably clamped to the base portion as seen at 25 so that the driving head may be removed and fitted on to the axle as is usual. The driving head 23 is equipped intermediate its length with a peripheral worm wheel 26 which extends and fits into a recess 27 therefor in the bearing seat 24 and this worm wheel is in driven engagement with a worm 28 keyed on a shaft 29 transversely journaled at the top of the bed. The shaft 29 also has fixed thereon a support pinion 30 which is in driven engagement with a pinion 31 keyed on an intermediate shaft 34 transversely journaled in the bed and underneath the shaft 29. The shaft 34 also has keyed thereon in spaced apart relation to each other and to the pinion 31 other pinions 32, 33 of diverse sizes, the intermediate pinion 32 being the smallest of the series, this arrangement making this series of pinions adaptable to co-operate with a triple gear 35 slidably keyed on a shaft 36 transversely journaled in the bed underneath the shaft 34 and constituting the prime drive shaft of the machine with means such as a belt pulley 37 at one projecting end thereof to receive driving impulse and having an interposed disconnecting clutch 38 which may be a friction clutch of known type. The triple gear 35 is composed of three pinion faces 35ª, 35ᵇ, 35ᶜ of diverse sizes and adapted to engage selectively with the gears 31, 32, 33 respectively according as said sliding gear is shifted to the extreme right or to the middle position as shown, or to the extreme left of its range of movement. For thus shifting the multiple gear 35 a rod 39 is slidably fitted transversely in the bed with a yoke block 40 fixed thereon and adapted to engage the sides of the largest or middle pinion member 35ᵇ. For yieldingly holding the rod 39 in either of its three adjusted positions it is formed with spaced apart cone seats 41 engageable by a cone pointed spring pressed plunger 42 fitted in a boss of the bed.

In accordance with my invention operative impulse for actuating the feed screw 19 is taken from the described gear train which operates the head and preferably in a manner so that the desired speed changes are transmitted also as feed changes with other interposed change gear devices to further extend the range of feed changes. For this purpose there is provided a shaft 43 transversely journaled in an upper portion of the bed adjacent, and as shown in horizontal alinement with the shaft 34 and having an extension 43ª at the front side of the bed and over the feed screw 19. This extension has fixed thereon a worm 44 which is in driving engagement with a worm wheel 45 fixed on the feed screw 19, this worm drive to the feed screw with the adjacent middle plain portion of the feed screw being shown as enclosed in a suitable housing 46 fixed at the side of the bed and having a bearing 47 for the outer end of the shaft extension 43ª. The shaft 43 has slidably keyed thereon a triple gear 48 composed of three diverse sized pinion elements 48ª, 48ᵇ, 48ᶜ with the middle one thereof the largest and these pinion elements are adapted to be selectively engaged with the spaced apart gears 31, 32, 33 by the shifting of said triple gear along the shaft 43.

This is accomplished by a shifter rod 49 slidably fitted in the bed in like manner as the rod 39 and similarly equipped with a shifter yoke block 50 and with a spring pressed detent 51 engaging notch recesses therein to hold the same in adjusted position. The rods 39, 49 have projections thereof at the front side of the bed equipped with suitable handles 39ª, 49ª respectively for convenient manipulation. Thus by adjusting the multiple gear 48 in conjunction with the multiple gear 35 three separate feed changes may be obtained for each one of the speed changes obtained by adjustment of the multiple gear 35 thus obtaining a range of nine feed changes. The clutch 38 of the prime drive pulley 37 is engaged for operation by a lever 52 pivoted at its lower end to the base of the bed at 53 and having pivoted thereto at an intermediate point a rod 54 which extends across underneath the bed and has its other end pivoted at 55 to a bell crank lever 56 which is pivoted to a depending lug of the bed at 57 and has a horizontally extending arm 58 constituting a handle extending at the front of the machine. This handle arm 58 is in position to be engaged at an intermediate point as seen at 59 by bevel faced blocks 60 carried on a rod 61 adjustably clamped to the carriages 15, 16 so that by adjusting the blocks 60 the carriage movement may be caused to throw the main driving clutch at any position desired. The described construction and arrangement of driving connections with the prime drive element, i. e., the main driving pulley at the center of the lathe and associated with the hollow work driving head permits such connections to be reduced to the greatest possible simplicity and with the smallest possible number of shaft centers arranged in parallelism and with relatively short length shafts, i. e., dispensing entirely with any need of shafting extending the length of the lathe as has been heretofore necessary. Further the connections to the feed screw thus provided and transmitted from the lathe center are adapted to operate the screw to best advantage and permit a maximum of feed changes with shiftable gear elements of the simplest possible character so that the operative assembly throughout is thus exceptionally simple and compact and also strong and reliable in use, while having a capability of most convenient and flexible manipulation to meet various requirements in use. Where the present machine is herein referred to as an axle lathe, this term is to be understood as illustrative and intended to include any construction adapted for work pieces in general that are held between dead centers and rotated from an intermediate driving head in a manner more or less after the usual manner of finishing car axles. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. An axle lathe equipped with opposite dead centers and an intermediate hollow driving head, opposite tool carriages, a feed screw to operate the same, and having a prime drive shaft journaled transversely of the lathe bed intermediate the length thereof and geared to operate said driving head and said feed screw.

2. An axle lathe equipped with opposite dead centers and an intermediate hollow driving head, opposite tool carriages, a feed screw, and prime driving means mounted transversely of the lathe bed intermediate the length thereof with change speed connections to said driving head, and change feed connections to said feed screw.

3. An axle lathe equipped with opposite dead centers and an intermediate hollow driving head, opposite tool carriages, a feed screw, and prime driving means mounted transversely of the lathe bed intermediate the length thereof with change speed connections to said driving head, and change feed connections to said feed screw connected to be driven through said change speed connections to multiply the range of feed changes obtainable.

4. An axle lathe having a bed with a hollow driving head intermediate the length thereof, a prime drive shaft journaled transversely in the bed underneath said driving head and geared thereto, and feeding means for the lathe tools also in geared driven connection with said prime drive shaft.

5. In an axle lathe, a bed having a hollow driving head mounted intermediate the length thereof, a prime drive shaft also journaled intermediate the length of the bed and transversely thereof, and change speed connections from said shaft to said driving head including a slidably shiftable gear with plural pinion faces of diverse sizes.

6. The combination with an axle lathe having opposite dead centers and an intermediate hollow driving head, opposite tool carriages and a feed screw for said carriages, of driving means consisting in a prime drive shaft mounted intermediate the length of the bed and transversely thereof with change speed gear connections to said driving head, and other change gear drive connections to said feed screw, each of said gear connections including a slidably shiftable multiple gear with a plurality of pinion faces of diverse sizes.

7. An axle lathe having a bed with an intermediate hollow driving head mounted thereon, opposite tool carriages, a prime drive shaft transversely journaled in the bed with operative connections to said driving head and to said tool carriages, a disconnecting clutch associated with said prime drive shaft, and means controlled by said carriages for throwing out said clutch at a predetermined point in carriage travel.

8. An axle lathe having a bed with a hollow driving head mounted intermediate the length thereof, tool carriages at each side of said driving head, a prime drive shaft journaled transversely of the bed adjacent said driving head and having a disconnecting clutch associated therewith, a handle for operating said clutch manually, and means on said said carriages for engaging said handle at a predetermined point of carriage travel to operate said clutch automatically.

In testimony whereof, I have signed my name to this specification.

WALLACE E. WARD.